(12) United States Patent
Fröjdh et al.

(10) Patent No.: US 6,907,071 B2
(45) Date of Patent: Jun. 14, 2005

(54) SELECTIVE PREDICTION FOR INTRA-CODING VIDEO DATA BLOCK

(75) Inventors: Per Fröjdh, Stockholm (SE); Rickard Sjöberg, Tumba (SE); Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 583 days.

(21) Appl. No.: 10/153,763

(22) Filed: May 21, 2002

(65) Prior Publication Data

US 2002/0176498 A1 Nov. 28, 2002

Related U.S. Application Data

(60) Provisional application No. 60/293,465, filed on May 24, 2001.

(51) Int. Cl.[7] ................................................. H04N 7/12
(52) U.S. Cl. ................ 375/240.12; 382/238; 348/409.1
(58) Field of Search ....................... 375/240.12, 240.15, 375/240.18, 240.24, 240.13, 240.29, 240.27; 382/236, 238; 348/394.1, 409.1

(56) References Cited

U.S. PATENT DOCUMENTS

| | | | | |
|---|---|---|---|---|
| 5,486,862 A | | 1/1996 | Yagasaki | 348/399 |
| 5,570,133 A | | 10/1996 | Yagasaki | 348/416 |
| 5,737,022 A | * | 4/1998 | Yamaguchi et al. | 375/240.15 |
| 5,886,741 A | | 3/1999 | Srivastava | 348/395 |
| 5,903,313 A | | 5/1999 | Tucker et al. | 348/416 |
| 6,415,055 B1 | * | 7/2002 | Kato | 382/236 |
| 6,587,509 B1 | * | 7/2003 | Suzuki et al. | 375/240.29 |

OTHER PUBLICATIONS

Raymond O. Hinds, et al.; "*Effect of Concealment Techniques on Perceived Video Quality*"; Part of the IS&SPIE Conference on Human Vision and Electronic Imaging IV SPIE; vol. 3677, Jan. 1999; pp. 207–217, XP002902709.
ISR PCT/SE 02/01007; Date Mail Sep. 26, 2002.
Chen, Tsuhan, "*Multimedia Communications: Coding, Systems and Networking*", 18–796, Spring, 1999.
Asbun, et al., "*On the Implementation of MPEG–4 Motion Compensation Using the TMS320C62x*", Texas Instruments Application Report SPRA586, dated Aug. 1999.

* cited by examiner

*Primary Examiner*—Gims Philippe

(57) ABSTRACT

In a method of video data compression a video frame in a sequence of frames is divided into a number of macroblocks, a particular macroblock being adjacent to a number of previously coded macroblocks including both intra-coded and inter-coded macroblocks. The method includes selecting either a full prediction or limited prediction type in encoding the particular macroblock to provide a corresponding data bit stream, full prediction using both adjacent inter-coded and intra-coded macroblocks, and limited prediction using intra-coded macroblocks only. A signal is provided along with the bit stream to indicate the selected prediction type to a decoder disposed to recover data from the bit stream. The prediction type may be either signaled explicitly, such as by providing a code word in the bit stream, or may be inferred implicitly by selected values or levels of a coding variable.

15 Claims, 2 Drawing Sheets

SELECTIVE PREDICTION FOR INTRA-CODING VIDEO DATA BLOCK

CROSS REFERENCE TO RELATED APPLICATION

This Application for Patent claims the benefit of priority from, and hereby incorporates by reference the entire disclosure of, U.S. Provisional Application for Patent No. 60/293,465, filed May 24, 2001, now abandoned.

BACKGROUND OF THE INVENTION

Technical Field of the Invention

The invention disclosed and claimed herein generally pertains to a method for coding or compressing video signal data. More particularly, the invention pertains to a method of the above type wherein an intra-coded block of video data can either be coded using predictions from adjacent intra-coded blocks only, or can be coded using predictions from both adjacent intra-coded and inter-coded blocks. Even more particularly, the invention pertains to a method of the above type wherein the type or mode of prediction used may be selected as a matter of choice, to either enhance resilience to transmission errors or to enhance data compression.

Digital video signals, in non-compressed form, typically contain large amounts of data. However, the actual necessary information content is considerably smaller due to high temporal and spatial correlations. Accordingly, video compression or coding is used to reduce the amount of data which is actually required for certain tasks, such as storage or transmission of the video signals. In the coding process temporal redundancy can be used by making so-called motion-compensated predictions, where regions of a video frame are predicted from similar regions of the previous frame. More specifically, there may be parts of a frame that do not contain any, or only slight, change from corresponding parts of the previous frame. Alternatively, if a good match with a previous frame cannot be found, predictions within a frame can be used to reduce spatial redundancy. With a successful prediction scheme, the prediction error will be small and the amount of information that has to be coded will be greatly reduced. Moreover, by transforming pixels to a frequency domain, e.g., by using the Discrete Cosine Transform (DCT), spatial correlations provide further gains and efficiency.

Notwithstanding the benefits of video data compression, the coded bit stream i.e., compressed data which is transmitted from one location to another, may become corrupted due to error-prone transmission channels. If this happens, relying too much on prediction may cause large potential damage, as prediction may propagate errors and severely decrease video quality. Accordingly, a technique has been developed in the prior art to reduce such damage by preventing temporal predictions at certain times, and more particularly by forcing a refresh (i.e., coding with no reference to previous frames) of a region or an entire picture. By distributing the refresh of different regions over many frames, the coding penalty can be spread out evenly. Then, in the event of an error, the video sequence can be recovered successfully frame-by-frame as the damage is corrected.

Herein, the terms "picture" and "frame" are used interchangeably to refer to a frame of image data in a video sequence.

It is seen from the above statements that the overall quality of a decoded video signal (following compression and transmission) is a trade-off between high compression on the one hand, and error resilience on the other. It is desirable to achieve high compression by employing prediction, particularly in error-free transmissions. However, it is also necessary to be able to limit error propagation caused by error-prone transmission channels.

Common video coding standards, such as the ITU-T Recommendations H.261 and H.263 and the ISO/IEC standards MPEG-1, MPEG-2 and MPEG-4, divide each frame of a video signal into 16×16 pixel regions called macroblocks. These blocks are scanned and coded sequentially row by row, from left to right. These common video standards are described more fully as follows:

ITU-T Recommendation H.261(1993), Video codec for audiovisual services at p×64 kbit/s.

ITU-T Recommendation H.263 (2001), Video codec for low bit rate communication.

ITU-T Recommendation H.26L, Test Model Long Term Number 7, Draft May 2001. ftp://standard.pictel.com/video-site/0104_Aus/VCEG-M81d0.doc.

ISO/IEC 11172-2:1993, Information technology—Coding of moving pictures and associated audio for digital storage media at up to about 1.5 Mbit/s—Part 2: Video (MPEG-1).

ISO/IEC 13818-2:2000, Information technology—Generic coding of moving pictures and associated audio information: Video (MPEG-2).

ISO/IEC 14496-2:2001, Information technology—Coding of audio-visual objects—Part 2: Visual (MPEG-4).

The first step in the coding process of a macroblock is to make a prediction based on the previously coded macroblocks. It is important to differentiate between two types of coding, known as intra-coding and inter-coding, respectively. Intra-coding (analogous to still-image coding) is not based on previous pictures. On the other hand, inter-coding is based on predictions from one or several pictures in the past, and may be motion-compensated. Intra-coding can utilize spatial predictions from adjacent regions, including prediction of transform coefficients and prediction of pixel levels. In the latter case, the prediction is based on reconstructed (coded and decoded) blocks to ensure that the same information is available to both the coder and the decoder.

In regard to intra-coding, it is useful to consider three cases differentiated by whether prediction is used at all, prediction is based only on other intra-coded regions, or prediction may be based on inter-coded regions as well as intra-coded regions.

Case 1—Intra-Coding Without Prediction

In ITU-T Recommendation H.261 and the baseline version of ITU-T Recommendation H.263, intra-coded macroblocks are self-contained still images that do not rely on prediction from surrounding macroblocks. Accordingly, intra-coded macroblocks are well suited for refresh.

Case 2—Intra-coding with Prediction from Intra-Coded Regions

In ITU-T Recommendation H.263 (Annex I) and the ISO/IEC video standards MPEG-1, MPEG-2 and MPEG-4, intra-coded macroblocks are predicted, wherein the prediction applies to transform coefficients of the above and/or previously coded macroblocks. Moreover, only those macroblocks that are intra-coded contribute, since motion-compensated (and thus inter-coded) macroblocks do not have coefficients which are relevant for intra-coding.

Case 3—Intra-coding with Prediction from Intra-Coded and/or Inter-Coded Regions

In a current working draft of the upcoming ITU-T standard (currently known as H.26L) another type of intra-coded macroblock has been used. Prediction is carried out for pixel levels, which means that neighboring motion-compensated, i.e., inter-coded, macroblocks can also be used in the prediction of an intra-coded macroblock.

An intra-coded macroblock that is predicted from an adjacent or neighboring motion-compensated macroblock, as described in Case 3 above, depends on past pictures and thus cannot be used on its own to provide a true refresh. A damaged area from a past frame is therefore likely to propagate even through intra-coded macroblocks. This problem can be avoided by predicting an intra-coded macroblock only from other adjacent intra-coded macroblocks, as described in Case 2. However, such a solution is more expensive, in that it requires higher bit usage and thus imposes a coding penalty.

SUMMARY OF THE INVENTION

In making the invention it has been recognized that problems of the prior art can be overcome by enabling a user to choose one of at least two available types of intra-coded prediction. Thus, the invention concerns the extent of prediction for so-called intra-coded macroblocks. By allowing prediction for an intra-coded macroblock from both adjacent intra-coded macroblocks and inter-coded macroblocks (referred to herein as full prediction), high data compression may be achieved. However, in order to ensure that intra-coded macroblocks can be used as temporal refresh, their prediction must be limited to or based on other intra-coded macroblocks only (referred to herein as limited prediction). This avoids any indirect references to past pictures through motion compensation.

By allowing a choice of whether full or limited prediction is used, it is possible to select limited prediction when high error resilience is demanded. On the other hand, full prediction can be selected when error resilience is not of primary concern, in order to achieve high compression and avoid an unnecessary coding penalty. The choice (of such types)may either be signaled explicitly in the bit stream, or inferred implicitly.

One embodiment of the invention is generally directed to a method of video data compression for use with a specified block included in a number of blocks derived by selectively dividing a video frame in a sequence of frames, wherein the specified block is adjacent to a number of previously coded blocks including both intra-coded blocks, and inter-coded blocks. The method includes the step of selecting a prediction type from a set comprising full prediction and limited prediction types, wherein as described above the full prediction type may use one or more of the adjacent intra-coded blocks and also one or more of the adjacent inter-coded blocks. However, the limited prediction type may use one or more of the adjacent intra-coded blocks only. The method further comprises using the selected prediction type in encoding the specified block, to provide a data bit stream corresponding to the specified block. A signal is provided along with the bit stream, to indicate the selected prediction type to a decoder disposed to recover data pertaining to the specified block. As indicated above, the prediction type may either be signaled explicitly in the bit stream or inferred implicitly, depending on which coding tools or parameters are used.

DETAILED DESCRIPTION OF THE EXEMPLARY EMBODIMENTS OF THE INVENTION

Figure 1:
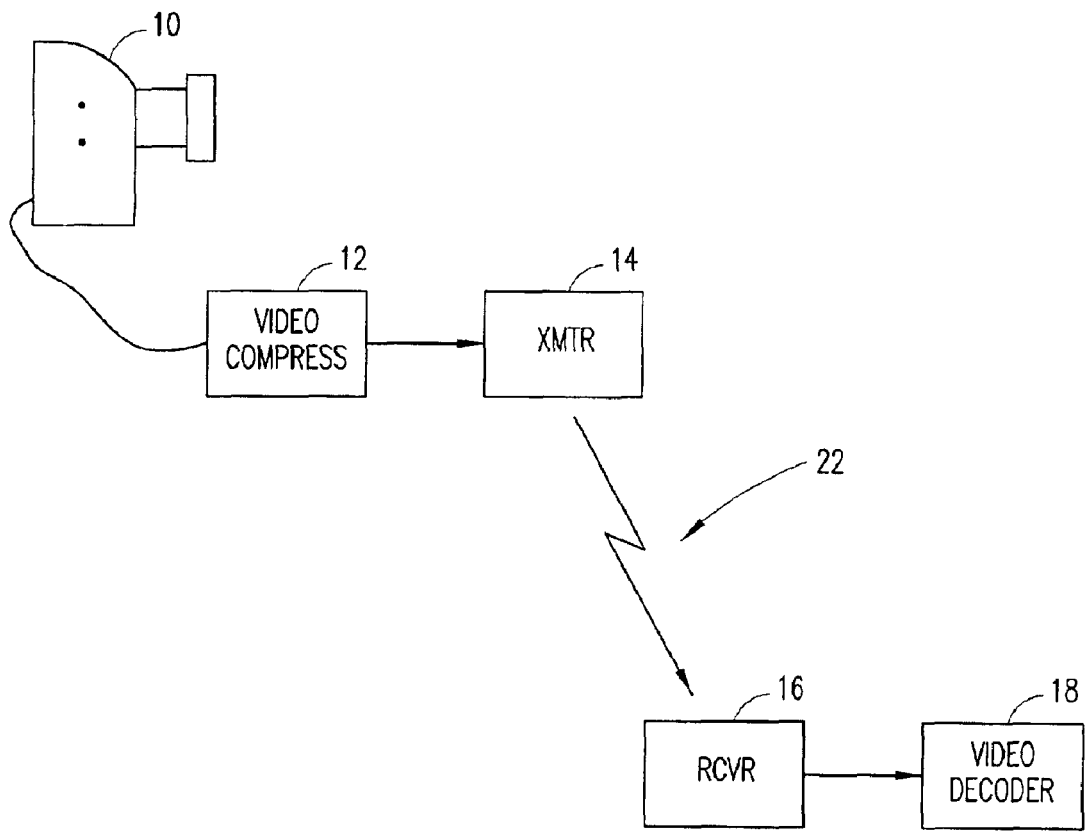
FIG. 1 is a schematic diagram showing a simplified system for compressing, transmitting, and decoding video information in accordance with embodiments of the invention.

Referring to FIG. 1, there is shown a source 10 of video information such as a video camera. The information, comprising a succession of video frames, is coupled to a video coder or compressor 12, which compresses successive frames of data in accordance with an embodiment of an invention, as described herein. A bit stream representing the compressed data is transmitted through a communication channel 22, which may be a wireless communication channel, from a transmitter 14 to a receiver 16. The received data is applied to a decoder 18 to recover the video information.

Figure 2:
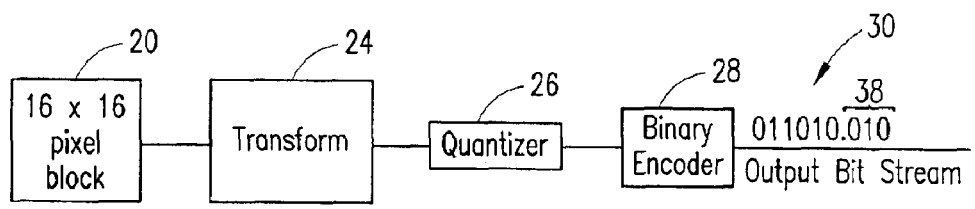
FIG. 2 is a block diagram showing certain components for the compressor of the system shown in FIG. 1.

Referring to FIG. 2, there are shown certain conventional components of a compressor 12 for processing a 16×16 pixel macroblock 20, derived by dividing a frame in a sequence of video frames (not shown). The components shown in FIG. 2 include a Transform, e.g., Discrete Fourier Transform module 24, a quantizer 26 and a binary encoder 28. Other conventional components of a video compressor, such as motion detection and motion compensation modules, are not shown in FIG. 2 for simplicity.

As is known in the art, transform module 24 receives an array of integers, comprising respective gray scale and color levels of the pixels of macroblock 20. Module 24 applies the transform to the pixel levels to generate an output array of transform coefficients. As is likewise well known, quantizer 26 divides each transform coefficient by a corresponding step size or quantization level. The output of quantizer 26 is directed to binary encoder 28, which generates a corresponding bit stream 30 for transmission through channel 22.

Figure 3:
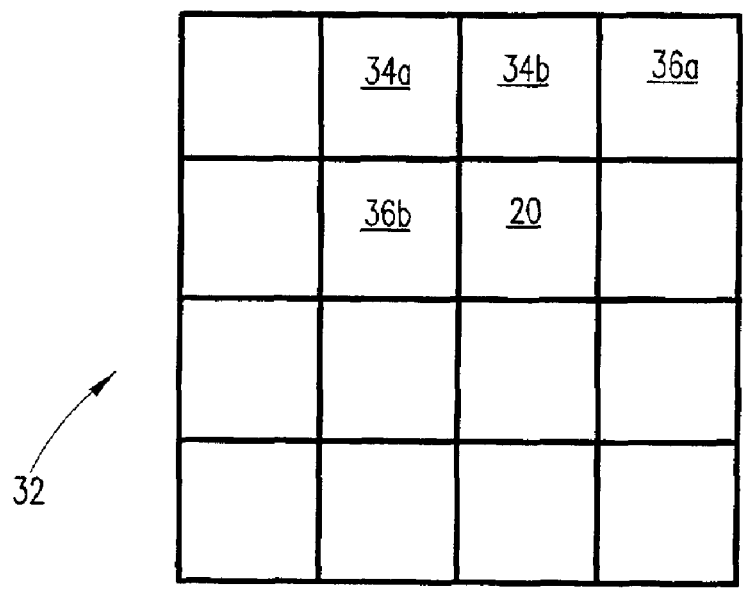
FIG. 3 is a schematic diagram showing an intra-coded macroblock, together with other intra-coded and inter-coded macroblocks adjacent thereto.

Referring to FIG. 3, there is shown a portion 32 of a video frame in a sequence or succession of frames, which has been divided into 16×16 pixel macroblocks in accordance with one of the standards referred to above. More particularly, FIG. 3 shows macroblock 20, and further shows macroblocks 34a–b and 36a–b which are respectively adjacent to and coded prior to macroblock 20. Moreover, macroblocks 34a–b are intra-coded macroblocks and macroblocks 36a–b are inter-coded macroblocks, as respectively defined above. That is, intra-coded macroblocks 34a–b are coded using only spatial predictions from adjacent regions of the same picture, or else are self-contained still images that do not rely on any predictions from surrounding macroblocks. On the other hand, inter-coded macroblocks 36a–b are based on predictions from regions of one or more previous frames and may be motion-compensated.

Macroblock 20 is to be intra-coded, that is, it is to be coded using spatial predictions only from previously coded adjacent macroblocks of the same frame, represented in FIG. 3 by macroblocks 34a–b and 36a–b. However, in accordance with the invention, the process of coding macroblock 20 can use either of two spatial prediction types, referred to herein as full prediction and limited prediction, respectively. In the full prediction type, predictions for coding macroblock 20 can be based on any or all previously coded macroblocks adjacent thereto, including both intra-coded macroblocks 34a–b and inter-coded macroblocks 36a–b. In the limited prediction type, prediction is based only on adjacent intra-coded macroblocks such as macroblocks 34a–b.

The selection of either full prediction or limited prediction can be implemented very simply, by explicitly signaling the extent of prediction in the bit stream, or implicitly by means of coding tools or other parameters. A number of such signaling alternatives are described hereinafter in further detail. When the signal is detected at the decoder side of channel 22, the decoder 18 spatially predicts macroblock 20 from adjacent already coded/decoded macroblocks in the same picture, such as macroblocks 34*a–b* and/or 36*a–b*. In accordance with the signal, the spatial prediction is either full or limited as described above, enabling the decoder to recover the original video data of macroblock 20.

Thus, embodiments of the invention can be used to optimize a video coding standard. For example, full prediction coding would be selected to achieve optimal coding efficiency, whereas limited prediction would be selected for transmission through an error-prone environment where error resilience is a significant concern.

In one embodiment of the invention, the choice between full and limited intra-coding prediction is signaled explicitly by a code word inserted into the bit stream for each macroblock. This is illustrated in FIG. 2, which shows a code word 38, such as 010, inserted into bit stream 30. More particularly, code word 38 is inserted into the header of an intra-coded macroblock, such as macroblock 20, and comprises a signal explicitly indicating to the decoder whether spatial prediction of the macroblock is full or limited.

Figure 4:
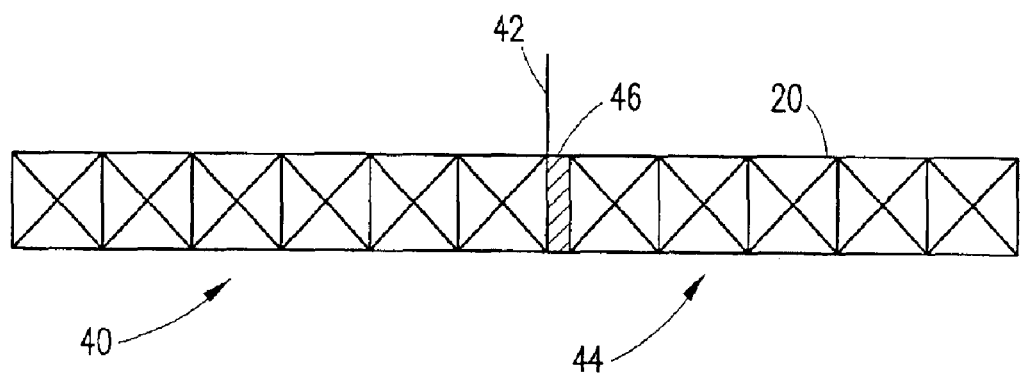
FIG. 4 is a schematic diagram showing two segments comprising a number of intra-coded macroblocks for illustrating alternative embodiments of the invention.

Referring to FIG. 4, there is shown a further embodiment of the invention, wherein intra-coded macroblock 20, after coding, is grouped with a number of other coded macroblocks in a slice or segment 44. Segment 44 comprises a portion of an image, and is separated at a boundary 42 from the immediately preceding coded macroblock segment 40. FIG. 4 further shows segment 44 provided with a header 46, which contains explicit information for signaling whether full or limited prediction should be used for all intra-coded macroblocks in segment 44.

In a modification of the embodiment shown in FIG. 4, the header of an entire picture signals explicitly whether full or limited prediction should be used for all intra-coded macroblocks in the picture. In a further modification, the header of a sequence of video frames signals explicitly whether full or limited prediction should be used for all intra-coded macroblocks in the sequence.

In other modifications associated with FIG. 4, a single signal indicating fill or limited prediction could apply to groups of blocks across segment boundaries such as boundary 42, or across a boundary between different video packets.

In a further embodiment of the invention, the selection of full or limited prediction is signaled implicitly, by means of selected variables associated with the coding and/or transmission of successive macroblocks. That is, different values or characteristics of the selected coding variable, which are detectable at the decoder, are used to indicate the full and limited prediction types, respectively. Such coding variables could include one of the optional coding tools used for coding a sequence, or a profile and/or level used therefor. For example, the level of a coding parameter, such as the quantizer step size, could have two different values to indicate full and limited prediction types, respectively.

In further modifications, the prediction selected can apply to pixel levels of both luma and chroma, and also to transform coefficients of luma and chroma.

Obviously, many other modifications and variations of the present invention are possible in light of the above teachings. It is therefore to be understood that within the scope of the disclosed concept, the invention may be practiced otherwise than as has been specifically described.

What is claimed:

1. A method of video data compression for use with a specified block included in a number of blocks derived by selectively dividing a video frame in a sequence of frames, said specified block being adjacent to a number of previously coded blocks including both intra-coded blocks and inter-coded blocks, said method comprising the steps of:

selecting a prediction type from a set comprising full prediction and limited prediction types, said full prediction type based on one or more of said intra-coded blocks and also one or more of said inter-coded blocks, and said limited prediction type based on one or more of said intra-coded blocks only;

using said selected prediction type in encoding said specified block to generate a data bit stream corresponding to said specified block; and providing a signal along with said bit stream to indicate said selected prediction type to a decoder disposed to recover data of said specified block.

2. The method of claim 1 wherein:

said selected prediction type is signaled explicitly by a code word in said bit stream.

3. The method of claim 1 wherein:

said prediction type is signaled explicitly by a code word in a bit stream for a macroblock.

4. The method of claim 1 wherein:

said specified block is grouped together with a number of other blocks, and said selected prediction type is signaled explicitly by a code word in a bit stream for said group of blocks.

5. The method of claim 1 wherein:

said selected prediction type is signaled explicitly by a code word in the bit stream for said frame containing said specified block.

6. The method of claim 1 wherein:

said selected prediction type is signaled explicitly by a code word in a bit stream for said sequence of frames.

7. The method of claim 1 wherein:

said selected prediction type is signaled implicitly by the value of a selected coding variable.

8. The method of claim 1 wherein:

said selected prediction type is signaled implicitly by the quantization level of a quantizer.

9. The method of claim 1 wherein:

said prediction type applies to pixel levels of luma and chroma.

10. The method of claim 1 wherein:

said prediction type applies to transform coefficients for luma and chroma.

11. The method of claim 1 wherein:

said prediction is allowed over segment boundaries.

12. The method of claim 1 wherein:

said prediction is allowed only inside a segment containing said specified block.

13. The method of claim 1 wherein:

said specified block comprises a 16×16 macroblock.

14. The method of claim 1 wherein:

said selected prediction type is signaled implicitly by the choice of optional coding tools.

15. The method of claim 1 wherein:

said selected prediction type is signaled implicitly by a choice of profiles and/or levels.

* * * * *

UNITED STATES PATENT AND TRADEMARK OFFICE
CERTIFICATE OF CORRECTION

PATENT NO. : 6,907,071 B2 Page 1 of 1
APPLICATION NO. : 10/153763
DATED : June 14, 2005
INVENTOR(S) : Fröjdh et al.

It is certified that error appears in the above-identified patent and that said Letters Patent is hereby corrected as shown below:

In Column 5, Line 45, delete "fill" and insert -- full --, therefor.

Signed and Sealed this

Twentieth Day of November, 2007

JON W. DUDAS
*Director of the United States Patent and Trademark Office*